Patented Nov. 28, 1939

2,181,217

UNITED STATES PATENT OFFICE 2,181,217

PARASITICIDE

William P. ter Horst, Packanack Lake, N. J., assignor, by mesne assignments, to United States Rubber Company, New York, N. Y., a corporation of New Jersey No Drawing. Application October 14, 1938, Serial No. 234,956

2 Claims. (Cl. 167—22)

This invention relates to improvements in parasiticide preparations.

It has been found that the reaction product of acetonyl acetone and ammonium thiocyanate possesses marked parasiticidal properties. This chemical, a purple powder, having a melting point of approximately 177° C. is readily prepared by combining, e. g., 200 grams of acetonyl acetone and 100 grams of ammonium thiocyanate, the latter preferably in the form of crystals. On mixing the two ingredients, an exothermic reaction takes place. After heating in a steam bath under reflux during approximately 24 hours, 1000 grams of water is added, to remove any unreacted ammonium thiocyanate and the water insoluble reaction product is filtered off. Yield: 183 grams of air dried material. The chemical nature of the product so obtained is at present unknown. Analysis indicates that the product contains 13.5% sulfur and 11.4% nitrogen and that two molecules of the ketone react with one molecule of ammonium thiocyanate.

The reaction product is quite insoluble in the common organic solvents. However, it can be crystallized from pyridine, diacetone-alcohol, or from boiling ethyl alcohol.

The reaction product of acetonyl acetone and ammonium thiocyanate has been found to possess definite fungicidal properties and repellent properties to insects as shown in the results of the following tests:

A suspension of this chemical in water greatly reduced the percentage germination of the fungus *Macrosporium sarcinaeforme*.

It has some toxicity towards insects as shown by the fact that a .25% suspension of the reaction product of acetonyl acetone and ammonium thiocyanate in water caused a mortality of 33.5% at the end of 24 hours when sprayed upon Golden Gleam nasturtium leaves containing black bean aphids (*Aphis rumicis*). However, a most important feature of this new chemical is its repellency.

It has been noted that Mexican bean beetle larvae when placed upon snap bean foliage that had been sprayed with a water suspension of the reaction product of acetonyl acetone and ammonium thiocyanate will not feed. At the end of 72 hours, 60% of the larvae had died and practically no foliage had been eaten, whereas in a control experiment, none had died and 70% of the foliage had been eaten.

Similar results are obtainable with Colorado potato beetle larvae and with imported cabbage worms.

Having thus described my invention, what I claim and desire to protect by Letters Patent is:

1. As a parasiticide, a preparation containing as an active constituent, a product of reaction of acetonyl acetone with ammonium thiocyanate.

2. As a new product, a compound of reaction of acetonyl acetone with ammonium thiocyanate, having a melting point of approximately 177° C.

WILLIAM P. ter HORST.